(12) United States Patent
Kotecha et al.

(10) Patent No.: US 9,038,135 B2
(45) Date of Patent: May 19, 2015

(54) QUALITY OF SERVICE APPLICATION

(75) Inventors: Lalit R. Kotecha, San Ramon, CA (US); William H. Stone, Basking Ridge, NJ (US); Matthew W. Nelson, Pleasanton, CA (US); Sanyogita Shamsunder, Basking Ridge, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 40 days.

(21) Appl. No.: 13/547,460

(22) Filed: Jul. 12, 2012

(65) Prior Publication Data

US 2014/0020060 A1    Jan. 16, 2014

(51) Int. Cl.
*H04L 29/06* (2006.01)
*H04W 12/06* (2009.01)
*H04W 4/20* (2009.01)
*H04L 29/08* (2006.01)

(52) U.S. Cl.
CPC .............. *H04W 4/20* (2013.01); *H04L 67/322* (2013.01); *H04W 12/06* (2013.01)

(58) Field of Classification Search
None
See application file for complete search history.

(56) References Cited

U.S. PATENT DOCUMENTS 8,174,988 B1 *   5/2012   Rogers et al. ................. 370/237
2011/0320631 A1 *   12/2011   Finkelstein ................... 709/232

\* cited by examiner

*Primary Examiner* — Gilberto Barron, Jr.
*Assistant Examiner* — Simon Kanaan

(57) ABSTRACT

A first network device receives an authentication request, from a second network device, to authenticate a user device and a first over-the-top application, stored on the user device, to determine whether to apply a level of quality of service to the first over-the-top application. The first network device authenticates the user device, based on the authentication requested. The first network device authenticates the first over-the-top application, based on the authentication request. The first network device sends an authentication result, based on the authentication of the user device and the first over-the-top application, to the second network device; and the second network device initiates, based on the authentication result, a process to apply a level of quality of service to information sent between the first over-the-top application and a provider associated with the first over-the-top application.

20 Claims, 9 Drawing Sheets

QUALITY OF SERVICE APPLICATION

BACKGROUND

A user may use various types of different applications on a user device. One type of application that the user may use on the user device is an over-the-top (OTT) application. An OTT application is an application that can use existing network infrastructure to communicate with an OTT application provider. The OTT application could be an audio, video, or voice application. The content sent to/from the OTT application may not be controlled by the provider of the network infrastructure. Thus, the OTT application may not receive any level of quality of service from the network infrastructure.

DETAILED DESCRIPTION OF PREFERRED EMBODIMENTS

The following detailed description refers to the accompanying drawings. The same reference numbers in different drawings may identify the same or similar elements.

Systems and/or methods described herein may apply a level of quality of service (to be referred to as "QoS") to an over-the-top application (to be referred to as an "OTT application"). The OTT application may be an audio application (e.g., Pandora), a video application (e.g., Hulu), or a voice application (e.g., Skype) that is stored on a user device. Applying a level of QoS to the OTT application may improve a user's experience when using that OTT application.

Figure 1A:
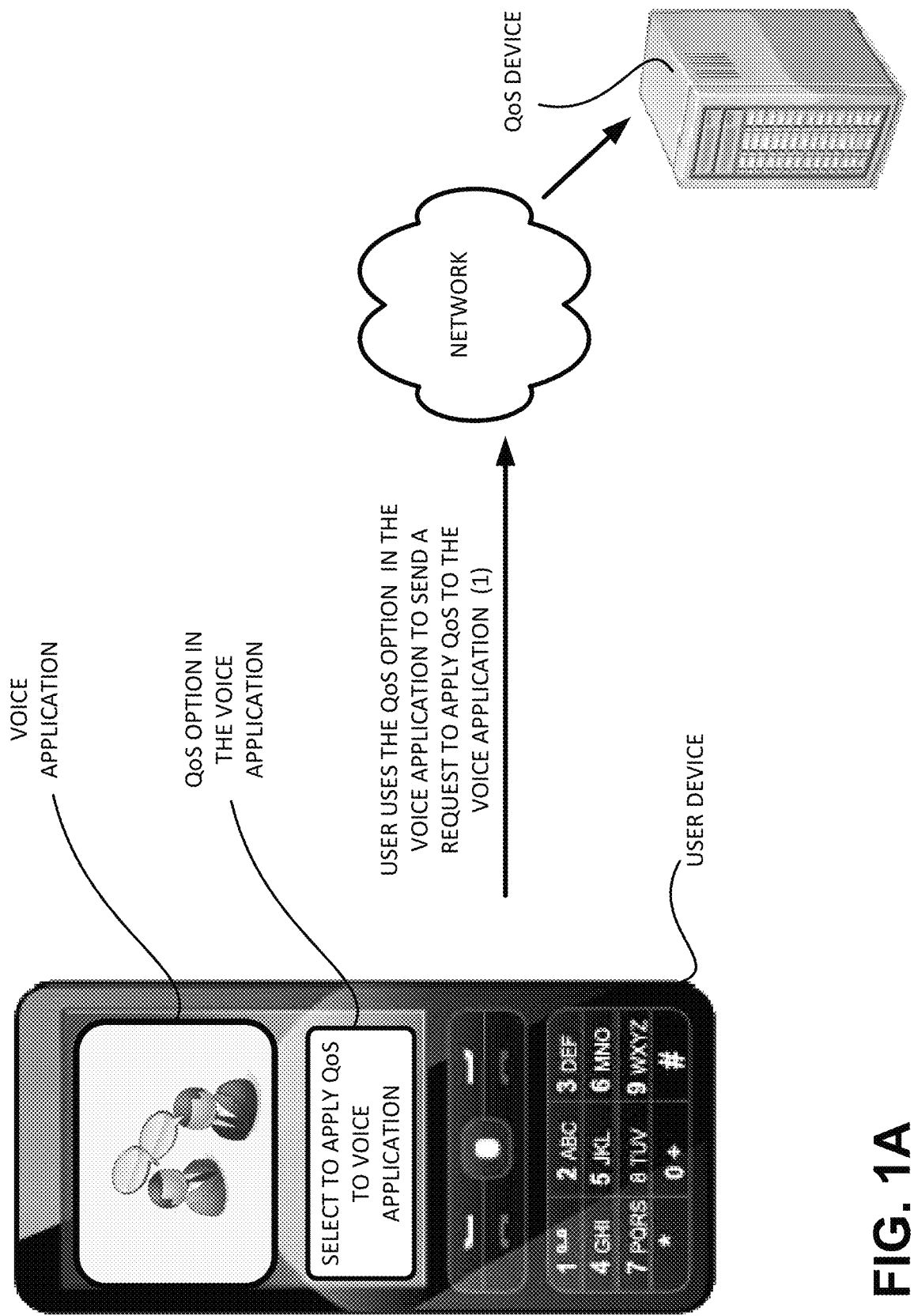
FIGS. 1A-1B are diagrams of an overview of an implementation described herein.
Figure 1B:
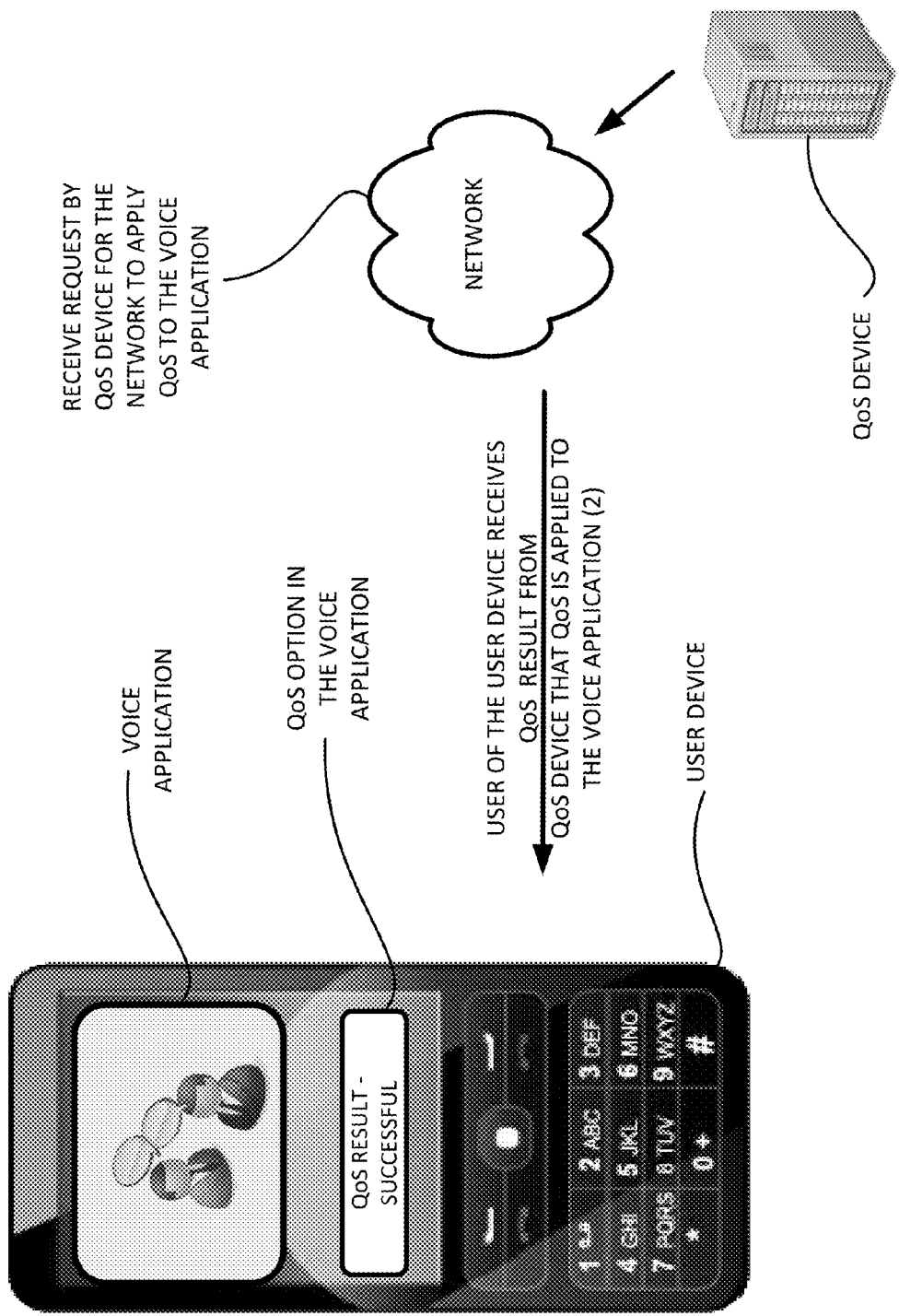

FIGS. 1A-1B are diagrams of an overview of an implementation described herein. FIG. 1A shows a user device, a network and a QoS device. In practice there may be additional, or fewer, user devices, networks, and/or QoS devices. As shown in FIG. 1A, a user, of the user device, may want to apply a level of QoS to an OTT application that is currently being used on the user device. The OTT application, for example, could be a voice application that is being used by the user to communicate with a friend on another device. The user, of the user device, may request the level of QoS for the voice application by using a QOS option in the voice application. The user device may send a request, to the QoS device, so that the QoS device may authenticate the voice application and allow the network to apply a level of QoS (see communication (1)), to the voice application.

As shown in FIG. 1B, the QoS device may allow the network to apply a level of QoS to the voice application. The QoS device may send a message indicating a QoS result (see communication (2)) to the user device. The QoS result may be successful or unsuccessful. A successful result may indicate, to the user, that a level of QoS is applied to the voice application. An unsuccessful result may indicate, to the user, that a level of QoS is not applied to the voice application. As shown in FIG. 1B, assume that the user, of the user device, receives a message indicating a successful QoS result. The voice application may now have a level of QoS applied by the network. While the OTT application discussed in the above example is a voice application, the OTT application may be an audio, video, or any other type of OTT application.

As a result, the user may receive a particular level of QoS for an OTT application that is being used on the user device. Thus, the OTT application, being used on the user device, may provide the user, of the user device, a better experience (e.g., clearer voice capabilities for a voice application, unfettered streaming for an audio or video application, etc.) than using the OTT application without applying a level of QoS to the OTT application.

Figure 2:
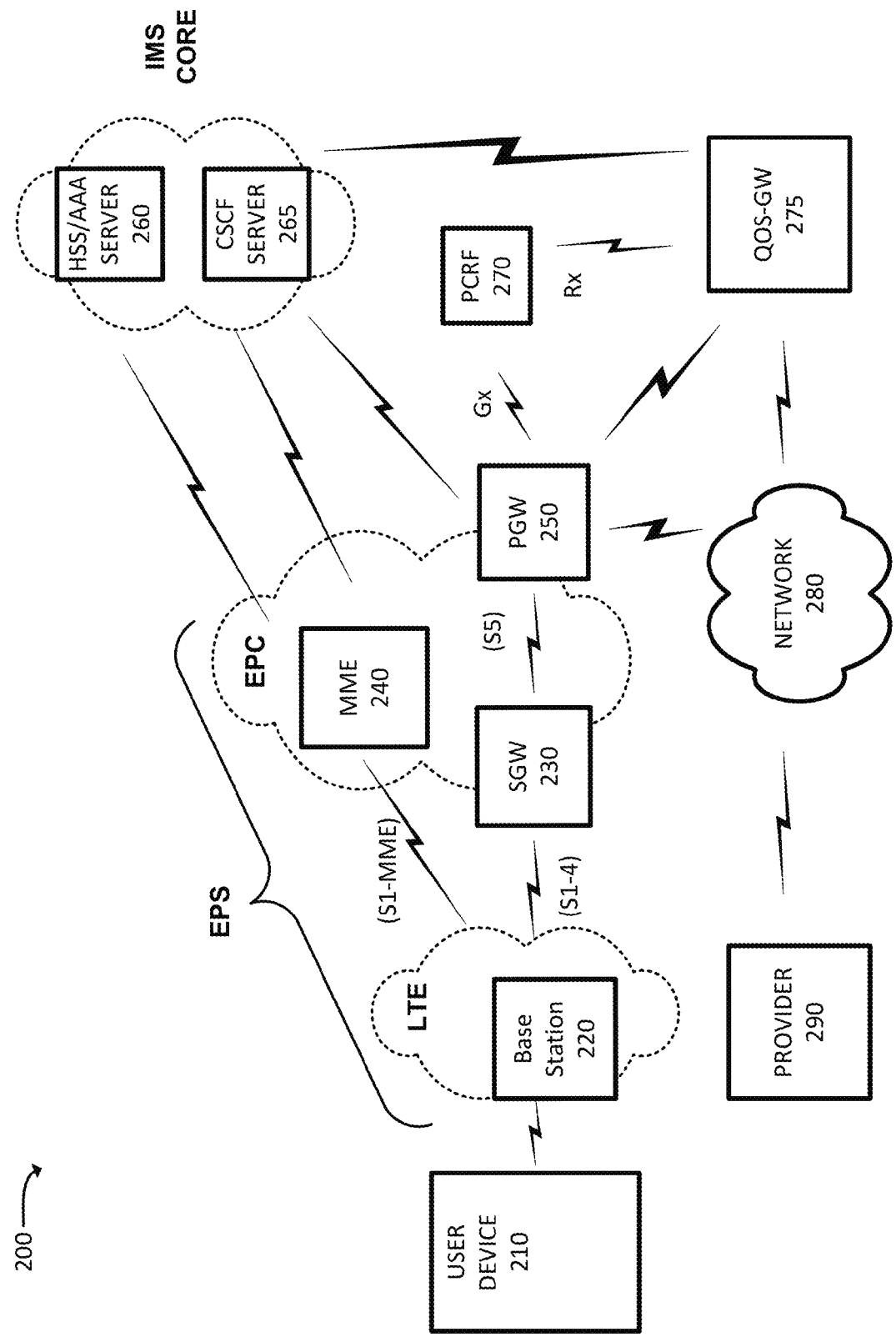
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a user device 210, a base station 220, a serving gateway 230 (hereinafter referred to as "SGW 230"), a mobility management entity device 240 (hereinafter referred to as "MME 240"), a packet data network (PDN) gateway 250 (hereinafter referred to as "PGW 250"), a home subscriber server (HSS)/authentication, authorization, accounting (AAA) server 260 (hereinafter referred to as "HSS/AAA server 260"), a call session control function (CSCF) server 265 (hereinafter referred to as "CSCF server 265"), a policy and charging rules function device 270 (hereinafter referred to as "PCRF 270"), a quality of service gateway 275 (hereinafter referred to as "QOS-GW 275), a network 280, and a provider 290. The quantity of devices and/or networks, illustrated in FIG. 2 is provided for explanatory purposes only. In practice, there may be additional devices and/or networks; fewer devices and/or networks; different devices and/or networks; and differently arranged devices and/or networks than illustrated in FIG. 2. Also, in some implementations, one or more of the devices of environment 200 may perform one or more functions described as being performed by another one or more of the devices of environment 200. Devices of environment 200 may interconnect via wired connections, wireless connections, or a combination of wired and wireless connections.

As further shown in FIG. 2, base station 220 may interface with MME 240 over a S1-MME interface. Base station 220 may interface with SGW 230 over a S1-4 interface. SGW 230 may interface with PGW 250 over a S5 interface. PGW 250 may interface with PCRF 270 over a Gx interface. PCRF may interface with QOS-GW 275 over a Rx interface. These interfaces are provided merely as examples of interfaces that may be used.

Environment 200 may include an evolved packet system (EPS) that includes a long term evolution (LTE) network and/or an evolved packet core (EPC) that operate based on a third generation partnership project (3GPP) wireless communication standard. The LTE network may be a radio access network (RAN) that includes one or more base stations, such as eNodeBs (eNBs), via which user device 210 communicates with the EPC. The EPC may include SGW 230, MME 240, PGW 250, PCRF 270, and/or QOS-GW 275 that enables user device 210 to communicate with network 280 and/or an Internet protocol (IP) multimedia subsystem (IMS) core. The IMS core may include HSS/AAA server 260 and/or CSCF server 265 and may manage authentication, session initiation, account information, a user profile, etc. associated with user device 210. The LTE network may include multiple base stations 220, and the EPC may include multiple SGWs 230, MMEs 240, PGWs 250, PCRFs 270 and/or QOS-GWs 275. The IMS core may include multiple HSS/AAA servers 260 and/or CSCF servers 265.

User device 210 may include any computation or communication device, such as a wireless mobile communication device that is capable of communicating with a network (e.g., network 280). For example, user device 210 may include a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a smart phone, a computer, a laptop, a tablet computer, a camera, a personal gaming system, a television, or another mobile, computation, or communication device.

User device 210 may include a variety of applications, such as, for example, a QoS application, an OTT application, an e-mail application, a telephone application, a camera application, a video application, a multi-media application, a music player application, a visual voicemail application, a contacts application, a data organizer application, a calendar application, an instant messaging application, a texting application, a web browsing application, a location-based application (e.g., a GPS-based application), a blogging application, and/or other types of applications (e.g., a word processing application, a spreadsheet application, etc.). The OTT application may include any of the above applications (e.g., a telephone application, a video application, or a multi-media application).

Base station 220 may include one or more network devices that receive, process, and/or transmit traffic, such as audio, video, text, and/or other data, destined for and/or received from user device 210. In an example implementation, base station 220 may be an eNB device and may be part of the LTE network. Base station 220 may receive traffic from and/or send traffic to network 280 via SGW 230 and PGW 250. Base station 220 may send traffic to and/or receive traffic from user device 210 via an air interface. One or more of base stations 220 may be associated with a RAN, such as the LTE network.

SGW 230 may include one or more network devices, or other types of computation or communication devices, that gather, process, search, store, and/or provide information in a manner described herein. SGW 230 may include one or more data processing and/or traffic transfer devices, such as a gateway, a router, a modem, a switch, a firewall, a network interface card (NIC), a hub, a bridge, a proxy server, an optical add-drop multiplexer (OADM), or some other type of device that processes and/or transfers traffic. SGW 230 may, for example, aggregate traffic received from one or more base stations 220 and may send the aggregated traffic to network 280 via PGW 250. In one example implementation, SGW 230 may route and forward user data packets, may act as a mobility anchor for a user plane during inter-base station handovers, and may act as an anchor for mobility between LTE and other 3GPP technologies.

MME 240 may include one or more network devices that gather, process, search, store, and/or provide information in a manner described herein. For example, MME 240 may perform operations associated with a handoff to and/or from the EPS. MME 240 may perform operations to register user device 210 with the EPS, to hand off user device 210 from the EPS to another network, to hand off a user device 210 from the other network to the EPS, and/or to perform other operations. MME 240 may perform policing operations for traffic destined for and/or received from user device 210.

PGW 250 may include one or more network devices that gather, process, search, store, and/or provide information in a manner described herein. PGW 250 may include one or more data processing and/or traffic transfer devices, such as a gateway, a router, a modem, a switch, a firewall, a NIC, a hub, a bridge, a proxy server, an OADM, or some other type of device that processes and/or transfers traffic. PGW 250 may, for example, provide connectivity of user device 210 to external packet data networks by being a traffic exit/entry point for user device 210. PGW 250 may perform policy enforcement, packet filtering, charging support, lawful intercept, and packet screening. PGW 250 may also act as an anchor for mobility between 3GPP and non-3GPP technologies. PGW 250 may authenticate user device 210 (e.g., via interaction with HSS/AAA server 260).

HSS/AAA server 260 may include one or more network devices, or other types of computation or communication devices, that gather, process, search, store, and/or provide information in a manner described herein. For example, HSS/AAA server 260 may manage, authenticate, update, and/or store, in a memory associated with HSS/AAA server 260, profile information associated with user device 210 that identifies applications and/or services that are permitted for and/or accessible by user device 210, bandwidth or data rate thresholds associated with the applications (such as an OTT application) or services, information associated with a user of user device 210 (e.g., a username, a password, a personal identification number (PIN), etc.), rate information, minutes allowed, and/or other information. Additionally, or alternatively, HSS/AAA server 260 may include a device that performs authentication, authorization, and/or accounting (AAA) operations associated with a communication session with user device 210.

CSCF server 265 may include one or more network devices, or other types of computation or communication devices, that gather, process, search, store, and/or provide information in a manner described herein. CSCF server 265 may process and/or route calls to and from user device 210 via the EPC. For example, CSCF server 265 may process calls, received from network 280, that are destined for user device 210. In another example, CSCF server 265 may process calls, received from user device 210, that are destined for network 280.

PCRF 270 may include one or more network devices, or other types of computation or communication devices, that gather, process, search, and/or provide information in a manner described herein. PCRF 270 may also store subscriber information, such as voice call and data rate plans or quotas for subscribers. PCRF 270 may provide network control regarding service data flow detection, gating, QoS, and/or flow based charging. Policies and rules regarding QoS may include policies and rules instructing user device 210 and network elements (base station 220, SGW 230, MME 240, PGW 250, etc.) to minimize packet loss, to implement a packet delay budget, to provide a guaranteed bit rate (GBR), to provide low latency, and/or to perform other activities associated with QoS. PCRF 270 may provide policies and rules to other network devices, such as HSS/AAAS server 260, QOS-GW 275, and/or PGW 250, to implement network control. PCRF 270 may determine how a certain service data flow shall be treated, and may ensure that user plane traffic mapping and QoS is in accordance with a user's profile and/or network policies.

QOS-GW 275 may include one or more network devices that gather, process, search, store, and/or provide information in a manner described herein. QOS-GW 275 may include one or more data processing and/or traffic transfer devices, such as a gateway, a router, a modem, a switch, a firewall, a NIC, a hub, a bridge, a proxy server, an OADM, or some other type of device that processes and/or transfers traffic. QOS-GW 275 may forward information about an OTT application, functioning on user device 210, to HSS/AAA server 260 so that HSS/AAA server 260 may authenticate the OTT application and/or user device 210. QOS-GW 275 may provide firewall and security services by validating incoming information (e.g., network traffic) from other entities (e.g., provider 290). In another example implementation, QOS-GW 275 may perform the one or more above-described functions of HSS/AAA server 260.

QOS-GW 275 may provide connectivity of user device 210 to external packet data networks by being a traffic exit/entry point for user device 210. QOS-GW 275 may provide an "opt-in/opt-out" service for applying QoS to an OTT application being used on user device 210. For example, a user, of user device 210, may "opt-in" to apply QoS, or the user may "opt-out" to stop applying QoS to the OTT application being used on user device 210.

Network 280 may include one or more wired and/or wireless networks. For example, network 280 may include a cellular network, a public land mobile network (PLMN), a second generation (2G) network, a third generation (3G) network, a fourth generation (4G) network, a fifth generation (5G) network, and/or another network. Additionally, or alternatively, network 280 may include a local area network (LAN), a wide area network (WAN), a metropolitan network (MAN), a telephone network (e.g., the Public Switched Telephone Network (PTSSN)), an ad hoc network, a managed IP network, a virtual private network (VPN), an intranet, the Internet, a fiber optic-based network (e.g., FIOS), and/or combination of these or other types of networks.

Provider 290 may include one or more server devices, or other types of computation or communication devices, that provide any type of application or application service. For example, provider 290 may provide an OTT application, such as Skype, Hulu, Netflix, or Vonage. Provider 290 may provide any application that can be used on user device 210 to communicate any media stream, such as a video stream, an audio stream, a textual stream, and/or any other type or form of content. Provider 290 may provide applications and/or services, such as games, scripts, and/or messaging services that may be used on user device 210.

Figure 3:
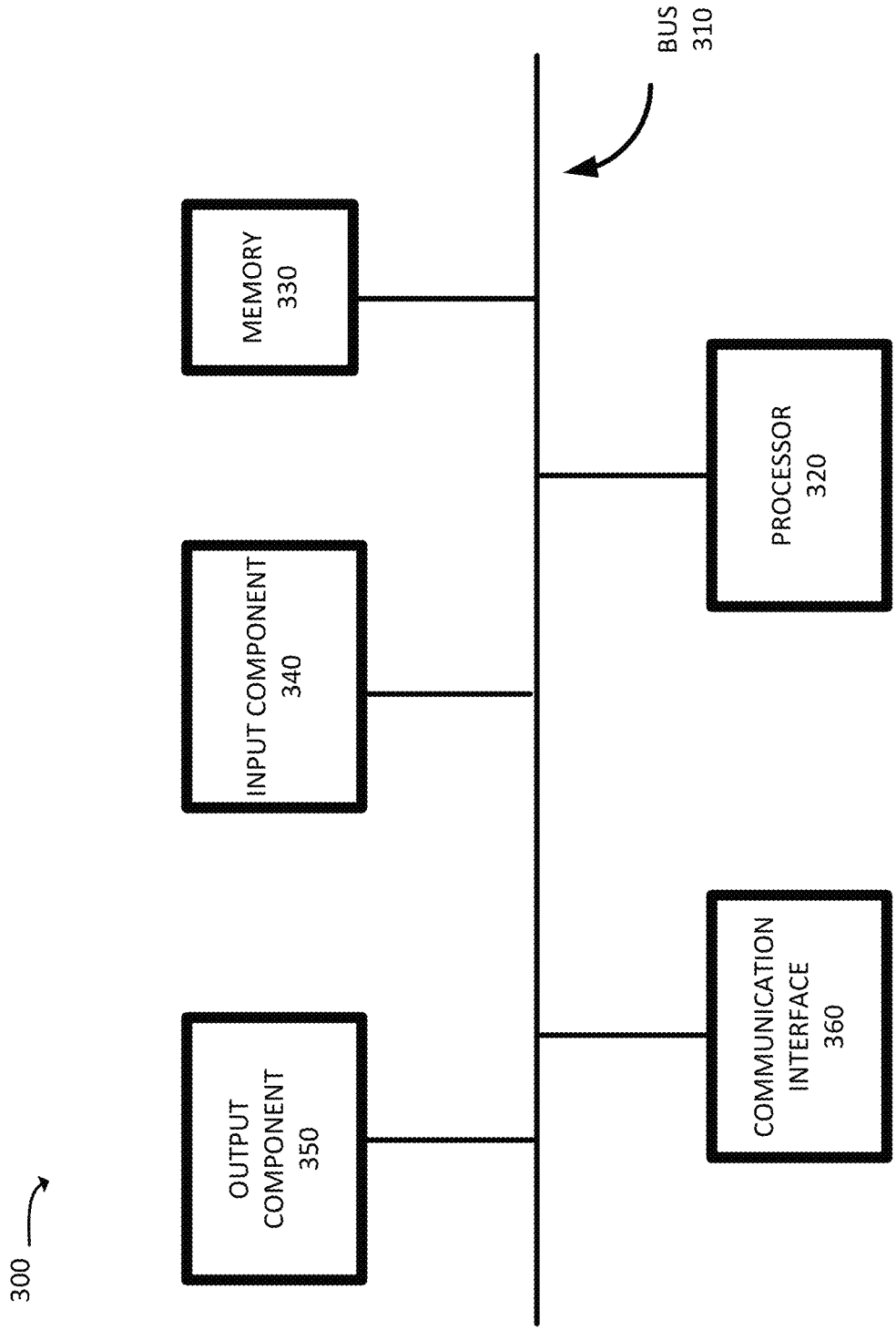
FIG. 3 is a diagram of example components of one or more devices of FIGS. 1A-1B and 2.

FIG. 3 is a diagram of example components of a device 300. Device 300 may correspond to user device 210, base station 220, SGW 230, MME 240, PGW 250, HSS/AAA server 260, CSCF server 265, PCRF 270, QOS-GW 275, and/or provider 290. Additionally, or alternatively, each of user device 210, base station 220, SGW 230, MME 240, PGW 250, HSS/AAA server 260, CSCF server 265, PCRF 270, QOS-GW 275, and/or provider 290 may include one or more devices 300 and/or one or more components of device 300.

As shown in FIG. 3, device 300 may include a bus 310, a processor 320, a memory 330, an input component 340, an output component 350, and a communication interface 360. In other implementations, device 300 may contain fewer components, additional components, different components, or differently arranged components than depicted in FIG. 3. Additionally, or alternatively, one or more components of device 300 may perform one or more tasks described as being performed by one or more other components of device 300.

Bus 310 may include a path that permits communication among the components of device 300. Processor 320 may include one or more processors, microprocessors, or processing logic (e.g., a field programmable gate array (FPGA), or an application specific integrated circuit (ASIC)) that interprets and executes instructions. Memory 330 may include any type of dynamic storage device that stores information and instructions, for execution by processor 320, and/or any type of non-volatile storage device that stores information for use by processor 320.

Input component 340 may include a mechanism that permits a user to input information to device 300, such as a keyboard, a keypad, a button, a switch, etc. Output component 350 may include a mechanism that outputs information to the user, such as a display, a speaker, one or more light emitting diodes (LEDs), etc.

Communication interface 360 may include any transceiver-like mechanism that enables device 300 to communicate with other devices and/or systems. For example, communication interface 360 may include an Ethernet interface, an optical interface, a coaxial interface, a wireless interface, or the like.

In another implementation, communication interface 360 may include, for example, a transmitter that may convert baseband signals from processor 320 to radio frequency (RF) signals and/or a receiver that may convert RF signals to baseband signals. Alternatively, communication interface 360 may include a transceiver to perform functions of both a transmitter and a receiver of wireless communications (e.g., radio frequency, infrared, visual optics, etc.), wired communications (e.g., conductive wire, twisted pair cable, coaxial cable, transmission line, fiber optic cable, waveguide, etc.), or a combination of wireless and wired communications. Communication interface 360 may connect to an antenna assembly (not shown in FIG. 3) for transmission and/or reception of the RF signals.

The antenna assembly may include one or more antennas to transmit and/or receive RF signals over the air. The antenna assembly may, for example, receive RF signals from communication interface 360 and transmit the RF signals over the air, and receive RF signals over the air and provide the RF signals to communication interface 360. In one implementation, for example, communication interface 360 may communicate with network 280 and/or devices connected to network 280.

As will be described in detail below, device 300 may perform certain operations. Device 300 may perform these operations in response to processor 320 executing software instructions (e.g., computer program(s)) contained in a computer-readable medium, such as memory 330, a secondary storage device (e.g., hard disk, CD-ROM, etc.), or other forms of RAM or ROM. A computer-readable medium may be defined as a non-transitory memory device. A memory device may include space within a single physical memory device or spread across multiple physical memory devices. The software instructions may be read into memory 330 from another computer-readable medium or from another device. The software instructions contained in memory 330 may cause processor 320 to perform processes described herein. Alternatively, hardwired circuitry may be used in place of or in combination with software instructions to implement processes described herein. Thus, implementations described herein are not limited to any specific combination of hardware circuitry and software.

Figure 4:
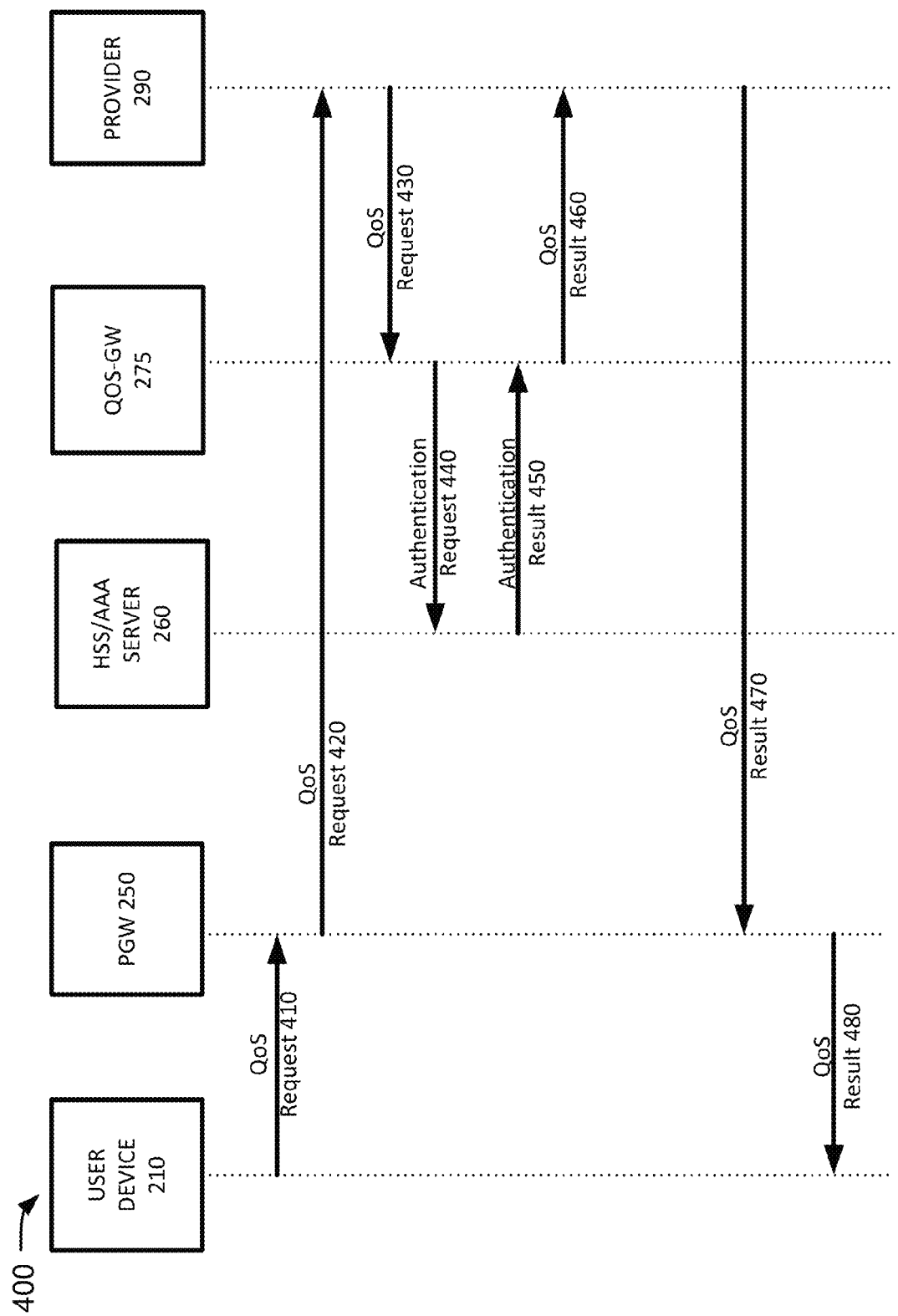
FIG. 4 is a call flow diagram of an example operation capable of being performed by an example portion of the environment in FIG. 2.

FIG. 4 is a call flow diagram of an example operation capable of being performed by an example portion 400 of environment 200. As shown in FIG. 4, portion 400 may include user device 210, PGW 250, HSS/AAA server 260, QOS-GW 275, and provider 290. User device 210, PGW 250, HSS/AAA server 260, QOS-GW 275, and provider 290 may include components and/or perform functions described above in connection with, for example, one or more of FIGS. 1-3.

Assume that there is an OTT application (associated with provider 290) stored on user device 210. The user, of user device 210, may select a QoS option in the OTT application to apply a level of QoS to the OTT application. The user may select to apply a level of QoS to user device 210 and/or the information sent between the OTT application and provider 290. By the user selecting the QoS option in the OTT application, user device 210 may send QoS request 410 to PGW 250 as shown in FIG. 4. QoS request 410 may be a request to apply a level of QoS to the OTT application. QoS request 410 may include information identifying user device 210. For example, QoS request 410 may include an international mobile subscriber identity (to be referred to as "IMSI"), mobile services integrated services digital network (to be referred to as "MSISDN"), and/or the mobile directory number (to be referred to as "MDN") identifier for user device 210. Additionally, or alternatively, QoS request 410 may include information identifying the OTT application. For example, QoS request 410 may include an identifier, such as an application name, that identifies the OTT application. Additionally, or alternatively, QOS request 410 may include information identifying provider 290. For example, QoS request 410 may include bandwidth and data usage information for the OTT application.

PGW 250 may receive QoS request 410. PGW 250 may analyze QoS request 410 and determine that QoS request 410 is a request for applying a level of QoS to user device 210 and/or the OTT application. PGW 250 may determine (based on the information identifying the OTT application and/or provider 290 in QoS request 410) that a QoS request message be sent to provider 290. PGW 250 may generate QoS request 420. PGW 250 may send QoS request 420 to provider 290. QoS request 420 may include identifier information for QOS-GW 275, and/or other information that was included in QoS request 410. In one example implementation, QoS request 420 may be similar to QoS request 410. In another example implementation, PGW 250 may modify QoS request 410 and QoS request 420 may be a modified message based on QoS request 410. In another example implementation, QoS request 420 may be a new message based on QoS request 410.

Provider 290 may receive QoS request 420. Provider 290 may analyze QoS request 420 and determine that QoS request 420 is a request for applying QoS to user device 210 and/or the OTT application. Provider 290 may determine (based on the identifier information for QOS-GW 275) that a QoS request message be sent to QOS-GW 275. Provider 290 may generate QoS request 430. Provider 290 may send QoS request 430 to QOS-GW 275. QoS request 430 may include information included in QoS request 420. In one example implementation, QoS request 430 may be similar to QoS request 420. In another example implementation, provider 290 may modify QoS request 420 and QoS request 430 may be a modified message based on QoS request 420. In another example implementation, QoS request 430 may be a new message based on QoS request 420.

QOS-GW 275 may receive QoS request 430. QOS-GW 275 may analyze QoS request 430 and determine that QoS request 430 is a request for applying a level of QoS to user device 210 and/or the OTT application. QOS-GW 275 may retrieve (and store) information identifying user device 210 (e.g., MDN for user device 210) and/or information identifying the OTT application, and/or provider 290, from QoS request 430. QOS-GW 275 may determine that user device 210 and/or the OTT application should be authenticated before any level of QoS may be applied to user device 210 and/or the OTT application. For authentication to be initiated, QOS-GW 275 may generate authentication request 440. Authentication request 440 may include identifier information for user device 210 and/or the OTT application; and information about the OTT application (e.g., the data usage and the bandwidth usage information of the OTT application). QOS-GW 275 may send authentication request 440 to HSS/AAA server 260.

In one example implementation, authentication request 440 may be similar to QoS request 430. In another example implementation, QOS-GW 275 may modify QoS request 430, and authentication request 440 may be a modified message based on QoS request 430. In another example implementation, authentication request 440 may be a new message based on QoS request 430.

HSS/AAA server 260 may receive authentication request 440. HSS/AAA server 260 may analyze authentication request 440 and determine that user device 210 and/or the OTT application should be authenticated. HSS/AAA server 260 may authenticate user device 210 by determining that user device 210 has permission (e.g., user device 210 is subscribed to the LTE network, described with regard to FIG. 2) to access the LTE network. HSS/AAA server 260 may authenticate the OTT application by determining whether the user has requested a level of bandwidth, for the OTT application, that does not exceed a maximum bandwidth level for information sent through the LTE network. Additionally, or alternatively, HSS/AAA server 260 may authenticate the OTT application by determining whether the user previously requested a level of QoS for one or more other OTT applications. For example, HSS/AAA server 260 may determine whether the combined bandwidth usage of QoS being applied to other OTT applications and the requested level of QoS for the OTT application is less than the maximum allowable level of bandwidth allowed by the LTE network.

HSS/AAA server 260 may generate an authentication result (authentication result 450) that indicates whether user device 210 and/or the OTT application is/are authenticated.

HSS/AAA server 260 may send authentication result 450 to QOS-GW 275. Authentication result 450 may include information about whether user device 210 and/or the OTT application, being used on user device 210, is, or is not, authenticated. QOS-GW 275 may receive authentication result 450. Authentication result 450 may indicate that HSS/AAA server 260 was successful in authenticating user device 210 and/or the OTT application stored on user device 210. Authentication result 450 may instruct QOS-GW 275 to apply other operations to information sent between OTT application and provider 290. For example, QOS-GW 275 may use authentication result 450 to determine whether the level of QoS applied to user device 210 and/or the OTT application can be increased to a higher level, or decreased to a lower level, of QoS. Also, for example, QOS-GW 275 may provide security operations (e.g., a firewall) to protect PGW 250 from information received from provider 290; and authentication operations to ensure that the information is being sent from a user device (such as user device 210) that is authorized to use the LTE network.

Alternatively, authentication result 450 may indicate that HSS/AAA server 260 was not successful in authenticating user device 210 and/or the OTT application stored on user device 210. Authentication result 450 may provide instructions to QOS-GW 275 not to accept any request for an increased, or decreased, level of QoS for the same OTT application. Authentication result 450 may provide instructions to QOS-GW 275 not to apply security and authentication operations to information sent between the OTT application and provider 290.

QOS-GW 275 may store authentication result 450. If the authentication result 450 indicates that the authentication is successful, QOS-GW 275 may send a message to PCRF 270 to implement the requested level of QoS. The message may be sent before or after generating QoS result 460 (described below). For example, PCRF 270 may receive a message from QOS-GW 275 to implement QCI 1 level in the LTE network. PCRF 270 may use policies and rules to send an initiation message to instruct network elements (e.g., base station 220, SGW 230, MME 240, PGW 250, etc.) and/or user device 210 to minimize packet loss, to implement a packet delay budget, to provide a guaranteed bit rate (GBR), to provide low latency, and/or to perform other activities associated with the requested level of QoS (e.g., QCI 1). With the requested level of QoS implemented by the network, PCRF 270 (or PGW 250) may send a message to QOS-GW 275 that the level of QoS is applied to user device 210 and/or the OTT application.

QOS-GW 275 may generate a QoS result message (QoS result 460) that indicates whether the level of QoS is, or is not, applied to user device 210 and/or the OTT application. QoS result 460 may include identifier information for user device 210, the OTT application, and/or provider 290. QOS-GW 275 may send QoS result 460 to provider 290. In one example implementation, QoS result 460 may be similar to authentication result 450. In another example implementation, QoS result 460 may be a modified message based on authentication result 450. In another example implementation, QoS result 460 may be a new message based on authentication result 450.

Provider 290 may receive QoS result 460. Provider 290 may determine that QoS result 460 includes information about whether the level of QoS is, or is not, applied to user device 210 and/or the OTT application. Provider 290 may generate a QoS result message (QoS result 470). Provider 290 may send QoS result 470 to PGW 250. In one example implementation, QoS result 470 may be similar to QoS result 460. In another example implementation, QoS result 470 may be a modified message based on QoS result 460. In another example implementation, QoS result 470 may be a new message based on QoS result 460.

PGW 250 may receive QoS result 470. PGW 250 may determine that QoS result 470 includes information about whether the requested level of QoS is, or is not, applied to user device 210 and/or the OTT application. PGW 250 may generate a QoS result message (QoS result 480). PGW 250 may send QoS result 480 to user device 210. In one example implementation, QoS result 480 may be similar to QoS result 470. In another example implementation, QoS result 480 may be a modified message based on QoS result 470. In another example implementation, QoS result 480 may be a new message based on QoS result 470.

User device 210 may receive QoS result 480. The user, of user device 210, may be notified that a level of QoS is, or is not, applied to user device 210 and/or the OTT application stored on user device 210.

Figure 5:
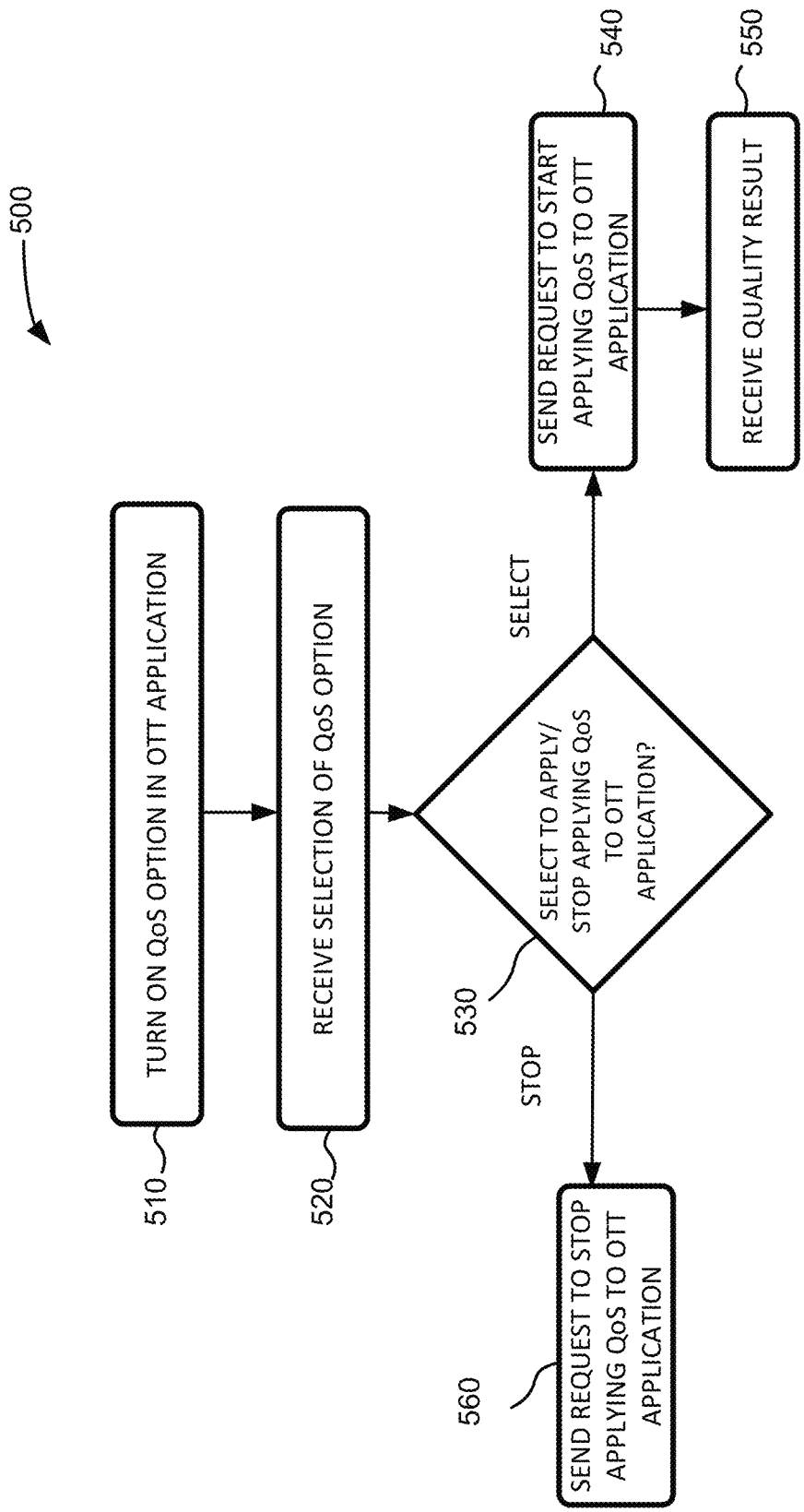
FIG. 5 is a flow chart of an example process for applying quality of service to an OTT application.

FIG. 5 is a flow chart of an example process 500 for applying QoS to an OTT application. In one implementation, process 500 may be performed by user device 210. In another example implementation, one or more blocks of process 500 may be performed by one or more other devices, such as QOS-GW 275.

Process 500 may include turning on a QoS option in an OTT application (block 510). For example, user device 210 may have a QoS option in an OTT application. The OTT application may be implemented in the memory of user device 210. The QoS option in the OTT application may allow a user, of user device 210, to apply a level of QoS to the OTT application (e.g., a voice application, an audio application, a streaming video application, etc.). In one example implementation, the QoS option, in the OTT application, may automatically turn on when the OTT application is initiated. In another example implementation, the QoS option, in the OTT application, may be turned on when instructed by the user, of user device 210. For example, there may be an indicator on the display of user device 210 that, when selected, may turn on the QoS option in the OTT application.

Process 500 may include receiving a selection for the QoS option (block 520). For example, the user, of user device 210, may select a QoS option, in the OTT application, to apply, or to stop applying, a level of QoS to user device 210 and/or to the OTT application stored on user device 210. The user, of user device 210, may select to apply a level of QoS (described with regard to FIG. 4) to user device 210 and/or the OTT application being used on user device 210. Alternatively, the user may select to stop applying any level of QoS to user device 210 and/or to the OTT application stored on user device 210. The user may select to apply, or stop applying, QoS to any OTT application, before, during, or after, the OTT application is used on user device 210.

The user may be given an option to select different levels of QoS. The user may be provided the option of selecting different levels of quality of service class identifier (to be referred to as "QCI") to be applied to the OTT application. For example, the user may select a level of QoS, such as any of QCI 1 through QCI 9.

The user may be given the option to arrange different blocks of time with different levels of QoS for an OTT application. For example, the user may choose QCI 1 service for Monday to Friday from 8 am to 6 pm, for the OTT application, and may choose no premium QoS treatment at all other times, for the same OTT application.

The user may be given an option to change the level of QoS for the OTT application. For example, the user may change the level of QoS, for the OTT application, from QCI 5 to QCI 1 (or vice versa), before, while, or after the OTT application is used on user device 210.

The user, of user device 210, may use the QoS application (on user device 210) to select different OTT applications that may be applied with different levels of QoS. For example, the user may have OTT application A (e.g., a video application) and OTT application B (e.g., a voice application) stored on user device 210. The user may select to apply a level of QoS for OTT application A and no level of QoS for OTT application B. Alternatively, the user may select to apply a level of QoS (e.g., QCI 1) for OTT application A and another level of QoS (e.g., QCI 6) for OTT application B.

If the QoS request is to apply QoS to the OTT application (block 530—SELECT), process 500 may include sending the QoS request to apply a level of QoS to the OTT application (block 540). For example, user device 210, may send a request to apply QoS, to the OTT application, to QOS-GW 275.

The QoS request may be a request to apply a level of QoS to the OTT application and/or user device 210. To send the QoS request, user device 210 may establish a connection with network 280. With a connection to network 280, user device 210 may send the QoS request to provider 290, described with regard to FIG. 4. The QoS request may include identifier information for user device 210 (e.g., the MDN for user device 210) and/or identifier information for the OTT application.

Provider 290 may send the QoS request to QOS-GW 275, described with regard to FIG. 4. QOS-GW 275 may receive the QoS request. QOS-GW 275 may store the identifier information for user device 210 and/or the identifier information for the OTT application. QOS-GW 275 may also store information that the user, of user device 210, has requested to apply ("opt-in") a level of QoS to user device 210 and/or the OTT application.

QOS-GW 275 may send an authentication request to HSS/AAA server 260, described with regard to FIG. 4. HSS/AAA server 260 may perform authentication to user device 210 and/or the OTT application, described with regard to FIG. 4.

The authentication by HSS/AAA server 260 may be successful or unsuccessful. For example, a successful authentication by HSS/AAA server 260 may be a result of confirming that user device 210 is only using one instance of the OTT application at a given time (e.g., there are not multiple different voice conversations, on user device 210, going on at the same time), and/or the OTT application is not using more than the assigned bandwidth. Additionally, or alternatively, a successful authentication may be a result of confirming that user device 210 is a valid user device (e.g., user device 210 has permission to use the network devices of the EPS and the IMS core portions of the LTE network described with regard to FIG. 2).

With a successful authentication, HSS/AAA server 260 may send the authentication result to QOS-GW 275, described with regard to FIG. 4. The authentication result may include information that user device 210 and/or the OTT application are authenticated. QOS-GW 275 may store authentication results for one or more OTT applications, and allow one or more OTT applications to be applied with one or more levels of QoS at the same time. QOS-GW 275 (with PCRF 270, as described with regard to FIG. 4) may notify network elements (e.g., PGW 250, SGW 240, etc.) and/or user device 210 to initiate a process to apply the level of QoS to information sent between the OTT application and provider 290. QOS-GW 275 may receive a notification from PCRF 270, or PGW 250, that the level of QoS is applied to information sent between the OTT application and provider 290.

The authentication result may instruct QOS-GW 275 to apply security and authentication operations (described with regard to FIG. 4) to information sent between the OTT application and provider 290.

Alternatively, an unsuccessful authentication by HSS/AAA server 260 may be a result of user device 210 and/or the OTT application using a level of bandwidth that exceeds the maximum bandwidth requirements, and/or user device 210 not being a valid user device (described with regard to FIG. 4). HSS/AAA server 260 may send the unsuccessful authentication result to QOS-GW 275. With an unsuccessful authentication result, QOS-GW 275 may not send a message to PCRF 270, so that PCRF 270 does not initiate a process to apply a level of QoS to the information sent between the OTT application and provider 290.

QOS-GW 275 may receive the authentication result and QOS-GW 275 may send a QoS result to provider 290, described with regard to FIG. 4. The QoS result may include information that user device 210 and/or the OTT application are not authenticated. The QoS result may include information that the requested level of QoS is not to be applied to user device 210; the OTT application; and the information sent between the OTT application and provider 290. QOS-GW 275 may store the authentication result.

Process 500 may include receiving the QoS result (block 550). For example, user device 210 may receive the QoS result from provider 290, described with regard to FIG. 4. The user, of user device 210, may view a message (from provider 290) on user device 210 that the level of QoS will be applied to the OTT application. The information, sent between the OTT application and provider 290, may now have a level of QoS applied by network elements (described with regard to FIG. 4), such as base station 220, SGW 230, MME 240, and/or PGW 250, in the LTE network (described with regard to FIG. 2).

Information (e.g., video, voice, etc.) sent between the OTT application (on user device 210) and provider 290 may traverse PGW 250 and QOS-GW 275. QOS-GW 275 may provide security and/or authentication operations to the information being sent between the OTT application and provider 290, described with regard to FIG. 4.

The user, of user device 210, may be charged a fee for receiving the level of QoS for the OTT application. For example, as the OTT application sends or receives an amount of information (applied with a level of QoS) to and/or from provider 290, PGW 250 (or QOS-GW 275) may send data about the amount of information (e.g., time of use, bandwidth, data usage) to another network device (e.g., HSS/AAA server 260, billing server, etc.) so that a fee (e.g., fixed fee, per hour fee, etc.) may be charged to the user.

Alternatively, the user, of user device 210, may view a message on user device 210 that the QoS request is not successful and the requested level of QoS will not be applied to the OTT application. The message may include information about why the requested level of QoS is not being applied to the OTT application (e.g., the OTT application is using too much bandwidth). The message may include an option for the user, of user device 210, to select another level of QoS to be applied to the OTT application. For example, the user, of user device 210, may be given an option to select a lower level of QoS (e.g., QCI 5) instead of the original requested level of QoS (e.g., QCI 2).

In one example implementation, when the QoS result is not successful and there is no level of QoS being applied, the OTT application, on user device 210, may send or receive information (e.g., video, voice, etc.) between provider 290, via PGW 250, without interacting with QoS-GW 275. In another example implementation, when the QoS result is not successful and there is no level of QoS being applied, the OTT application, on user device 210 may send information between the OTT application and provider 290 via PGW 250 and QOS-GW 275. In this situation, QOS-GW 275 may not provide any authentication and security operations to information sent between the OTT application and provider 290.

If the QoS request to stop applying QoS is selected (block 530—STOP), process 500 may include sending a request to stop applying a level of QoS to the OTT application (block 560). For example, the user, of user device 210, may want to stop applying a level of QoS to the OTT application being used on user device 210. The request to stop applying the level of QoS to the OTT application may be sent from user device 210 to QOS-GW 275. QOS-GW 275 may receive the request to stop applying the level of QoS to the OTT application.

QOS-GW 275 may stop the level of QoS from being applied to user device 210 and/or the OTT application. QOS-GW 275 may send a message to PCRF 270 to stop the level of QoS from being applied to the OTT application and/or user device 210. PCRF 270 may send a message, using policies and rules, to the network elements (e.g., SGW 240, PGW 250, etc.) to stop applying the level of QoS. The network elements may stop applying a level of QoS to user device 210 and/or the OTT application. PGW 250, or PCRF 270, may notify QOS- GW 275 that the level of QoS is no longer being applied to the OTT application and/or user device 210.

QOS-GW 275 may communicate to provider 290 that the level of QoS is no longer applied to the OTT application and/or user device 210. Provider 290, via PGW 250, may communicate to user device 210 that the level of QoS being applied to the OTT application has stopped. The user, of user device 210, may receive a message (from provider 290 or QOS-GW 275) that no level of QoS is being applied to the OTT application on user device 210.

The OTT application may send and receive information from provider 290 via PGW 250 without any level of QoS being applied by network devices (e.g., base station 220, SGW 230, MME 240, and/or PGW 250) to information being sent between the OTT application and provider 290.

In one example implementation, when there is no level of QoS being applied, information being sent between the OTT application and provider 290 may traverse through QOS-GW 275. QOS-GW 275 may not provide any authentication and security operations to the information sent between the OTT application and provider 290. In another example implementation, when there is no level of QoS being applied, information being sent between the OTT application and provider 290 may not traverse through QOS-GW 275.

Figure 6:
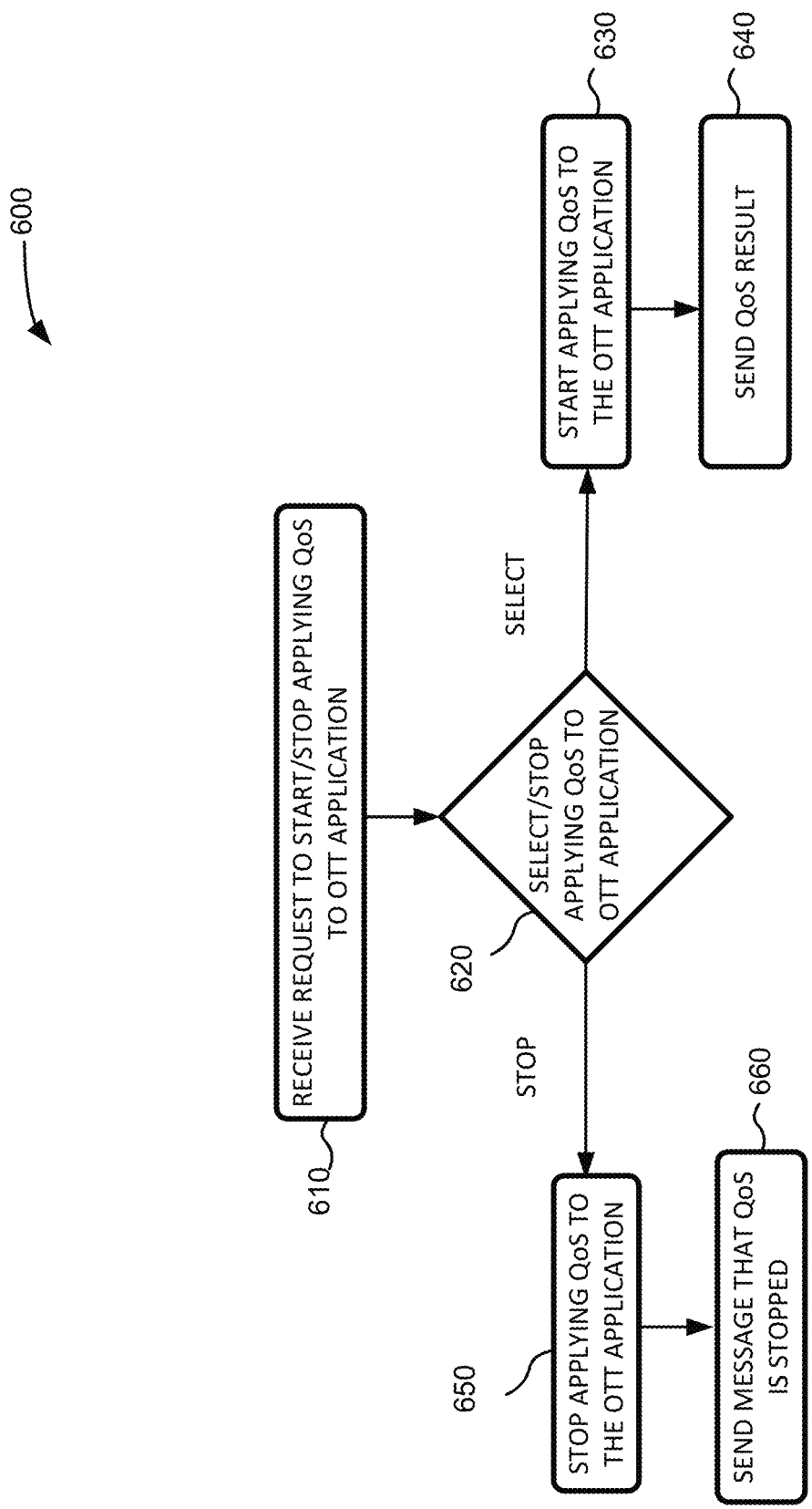
FIG. 6 is a flow chart of an example process for applying quality of service to an OTT application.

FIG. 6 is a flow chart of an example process 600 for applying QoS to an OTT application. In one implementation, process 600 may be performed by QOS-GW 275. In another example implementation, one or blocks of process 600 may be performed by one or more other devices, such as HSS/AAA server 250, or user device 210.

Process 600 may include receiving a request to apply, or to stop applying, a level of QoS to an OTT application (block 610). For example, QOS-GW 275 may receive a QoS request from user device 210, described with regard to FIG. 4. The request may be to start applying a level of QoS to user device 210 and/or an OTT application stored on user device 210. Alternatively, the request may be to stop applying a level of QoS to user device 210 and/or the OTT application stored on user device 210.

If the request is to apply a level of QoS to the OTT application (block 620—SELECT), process 600 may include applying a level of QoS to the OTT application (block 630). For example, QOS-GW 275 may receive a request to apply a level of QoS to user device 210 and/or the OTT application stored on user device 210, described with regard to FIG. 4. QOS-GW 275 may determine that the QoS request is to be sent to HSS/AAA server 260. QOS-GW 275 may send the QoS request to HSS/AAA server 260, so that HSS/AAA server 260 may authenticate user device 210 and/or the OTT application, described with regard to FIG. 4. HSS/AAA server 260 may authenticate user device 210 and/or the OTT application, described with regard to FIG. 4. QOS-GW 275 may receive and store the authentication result. The authentication result may be successful, or the authentication result may not be successful. If the authentication result is successful, QOS-GW 275 may send a message to PCRF 270 to implement the requested level of QoS, as described with regard to FIG. 4. PGW 250, or PCRF 270, may notify QOS-GW 275 that the level of QoS is applied to user device 210 and/or the OTT application.

Process 600 may include sending the QoS result to the user device (block 640). For example, QOS-GW 275 may send the QoS result to provider 290, described with regard to FIG. 4. Provider 290 may send the QoS result to user device 210, described with regard to FIG. 4. User device 210 may receive the QoS result and the user, of user device 210, may view a message (on user device 210) about whether the level of QoS is, or is not, applied to user device 210 and/or the OTT application.

When the level of QoS is applied to user device 210 and/or the OTT application, information sent between the OTT application and provider 290 may be sent through PGW 250 and QOS-GW 275. QOS-GW 275 may perform security and authentication operations to information sent between the OTT application and provider 290, described with regard to FIG. 4.

Alternatively, when no level of QoS is applied to user device 210 and/or the OTT application, information may be sent between the OTT application and provider 290 as described with regard to block 550 in FIG. 5.

If the request is to stop applying QoS to the OTT application (block 620—STOP), process 600 may include discontinuing to administer a level of QoS to the OTT application (block 650). For example, QOS-GW 275 may receive a request to stop applying QoS from the user of user device 210 (via provider 290). In one example implementation, QOS-GW 275 (via PCRF 270) may stop the level of QoS from being applied to user device 210 and/or the OTT application, described with regard to block 560 in FIG. 5.

Process 600 may include sending a message that the level of QoS is stopped (block 660). The user, of user device 210, may view a message, from QOS-GW 275 (or provider 290), on user device 210, that the level of QoS being applied to the OTT application is stopped. In one example implementation, when there is no level of QoS being applied, the OTT application, on user device 210, may send or receive information (e.g., video, voice, etc.) to provider 290 via PGW 250 without interacting with QOS-GW 275. In another example implementation, when there is no level of QoS being applied, the OTT application, on user device 210, may send or receive information to provider 290 via PGW 250 and QOS-GW 275.

Figure 7A:
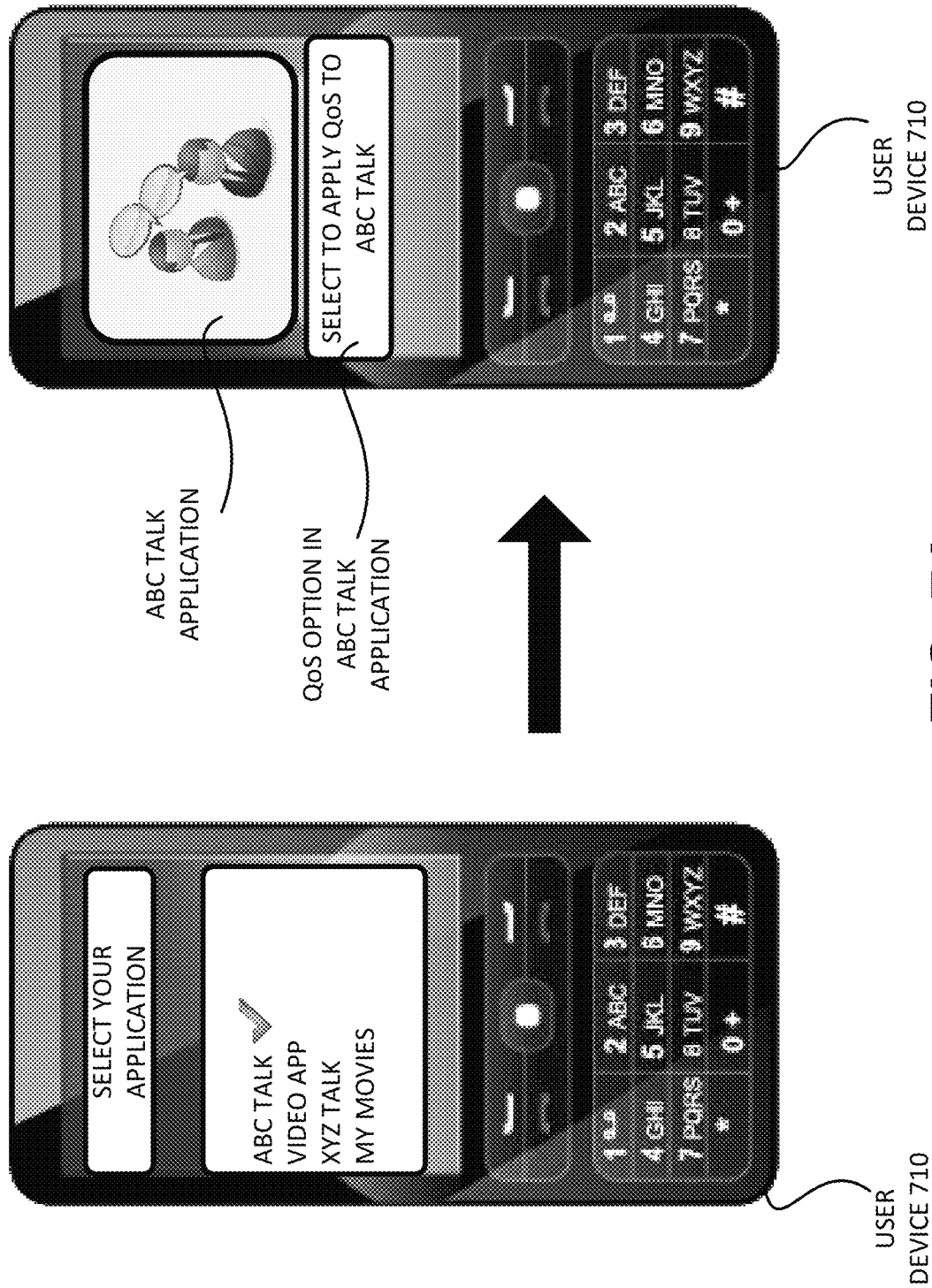
FIGS. 7A-7B are diagrams of example processes for applying a level of quality of service to an OTT application.

FIG. 7A is a diagram of an example process for applying a level of QoS to an OTT application. FIG. 7A shows a user device 710. An example of user device 710 may correspond to user device 210, described with regard to FIG. 2. As shown in FIG. 7A, a user ("Ben"), of user device 710, may decide to select an OTT application. Ben may have several different OTT applications from which to select. Ben decides to select the OTT application called ABC Talk, which is a voice application that allows Ben to talk with other users who have also downloaded the ABC Talk application onto their user devices. As shown in FIG. 7A, the ABC Talk application may now be displayed on user device 710. Ben decides to select the QoS option, in the ABC Talk application, to apply a level of QoS to the ABC Talk application.

Figure 7B:
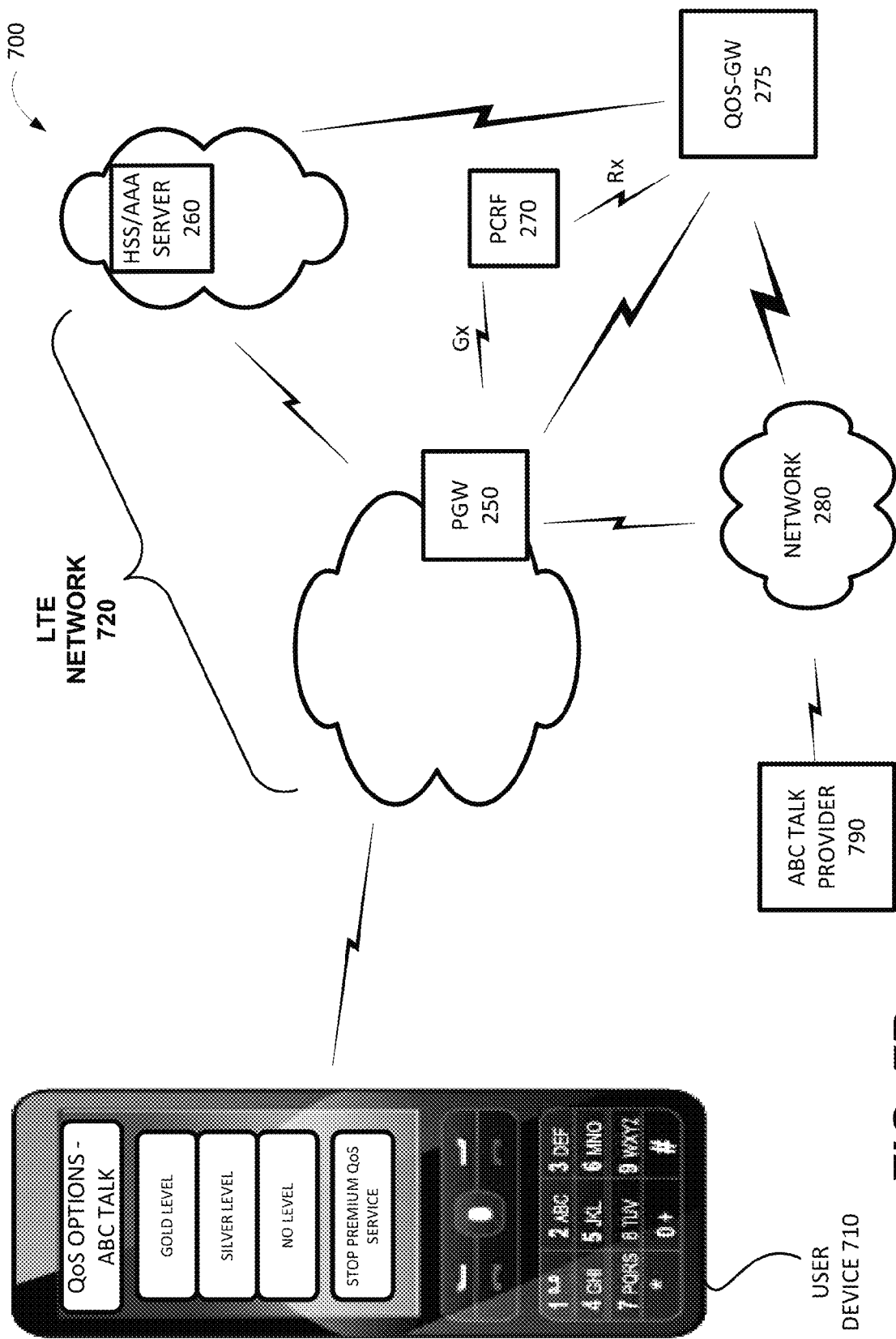

FIG. 7B is a diagram of an example process 700 for applying a level of QoS to an OTT application. FIG. 7B shows a user device 710, LTE network 720, PGW 250, HSS/AAA server 260, PCRF 270, QOS-GW 275, network 280 and ABC Talk provider 790.

An example of LTE network 720 may correspond to one or more devices (base station 220, SGW 230, MME 240, and CSCF server 265) that make up the EPS and IMS core segments, described with regard to FIG. 2. An example of ABC Talk provider 790 may correspond to provider 290, described with regard to FIG. 2. Further, as shown in FIG. 7B, PGW 250 may interface with PCRF 270 over a Gx interface, and PCRF 270 may interface with QOS-GW 275 over a Rx interface.

As shown in FIG. 7B, assume that user device 710 is connected to ABC Talk provider 790, via LTE network 720 and network 280. Assume that Ben (the user of user device 710) has selected the QoS option in the ABC Talk application (on user device 710), described with regard to FIG. 7A. Ben may be given an option of selecting a level of QoS. For example, Ben may have the choice to choose a "gold" level, a "silver" level of QoS, or no level of QoS, for the ABC Talk application. There may be additional, or fewer, options available to Ben. Each level of QoS may provide a different level of quality that may also have different financial charges that are charged to a user (such as Ben) of an OTT application (such as ABC Talk). Ben may also have the option to stop applying any level of QoS to the ABC Talk application, at a later time.

Ben decides that he wants a higher level of QoS for the ABC Talk application being used on user device 710. Ben may select the "gold level" (displayed on user device 710) for the ABC Talk application. Assume that the "gold level" selection is the equivalent to QCI 1 level of QoS. Upon Ben selecting the "gold level," a request for QoS message is sent from the ABC Talk application to ABC Talk provider 790. ABC Talk provider 790 may receive the QoS request from user device 710.

ABC Talk provider 790 may send the QoS request to QOS-GW 275, via network 280. QOS-GW 275 may be part of LTE network 720. QOS-GW 275 may receive the QoS request from ABC Talk provider 790. QOS-GW 275 may store identifier information about user device 710. QOS-GW 275 may store information about Ben's request to apply a level of QoS to the ABC Talk application. QOS-GW 275 may send an authentication request to HSS/AAA server 260.

HSS/AAA server 260 may authenticate user device 710 by validating that user device 710 is authorized to use LTE network 720. HSS/AAA server 260 may authenticate the ABC Talk application by making sure that the ABC Talk application is not using more than a maximum bandwidth level permissible on LTE network 720. For example, HSS/AAA server 260 may determine whether there were any prior QoS requests from user device 710, and determine whether user device 710 is requesting more LTE network resources (such as bandwidth) than LTE network 720 is able to provide. HSS/AAA server 260 may send an authentication result to QOS-GW 275. QOS-GW 275 may receive the authentication result from HSS/AAA server 260. QOS-GW 275 may send a message to PCRF 270 so that PCRF 270 (using policies and rules) may send a notification to other network devices in LTE network 720 (e.g., base station 220, SGW 230, MME 240, and/or PGW 250) to apply the requested level of QoS (QCI 1) to the ABC Talk application on user device 710. When information is sent between the OTT application and ABC Talk provider 790, through LTE network 720, the QCI 1 level of QoS is applied to the information. The QCI 1 level may include applying a packet delay budget (e.g., 100 ms), providing a guaranteed bit rate (GBR), and/or providing low latency for the information sent between the ABC Talk application and ABC Talk provider 790. The ABC Talk application is now given the "gold level" of QoS. QOS-GW 275 may store the authentication result. QOS-GW 275 may send a QoS result to ABC Talk provider 790, via network 280. ABC Talk provider 790 may send the QoS result to user device 710. Ben may receive a message (e.g., from ABC Talk provider 790) that the request to apply a level of QoS to the OTT application is successful. Ben may now use the ABC Talk application with a QCI 1 level of QoS.

Systems and/or methods described herein may allow a user, of a user device, to apply a level of QoS to an OTT application. The OTT application may communicate information, with an OTT provider, that is provided with a level of QoS by a LTE network. As a result, the user may have a better experience (e.g., clearer voice capabilities, fewer failed transactions, etc.) than using the OTT application without applying a level of QoS.

The foregoing description of implementations provides illustration and description, but is not intended to be exhaustive or to limit the implementations to the precise form disclosed. Modifications and variations are possible in light of the above disclosure or may be acquired from practice of the implementations.

While series of blocks have been described with regard to FIGS. 5 and 6, the order of the blocks may be modified in other implementations. Further, non-dependent blocks may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used in the present application should be construed as critical or essential unless explicitly described as such. Also, as used herein, the article "a" is intended to include one or more items and may be used interchangeably with "one or more." Where only one item is intended, the term "one" or similar language is used. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A system comprising:
a first network device that includes one or more processors to:
receive a request to apply a level of quality of service to an over-the-top application stored on a user device;
send an authentication request, to a second network device, based on receiving the request,
the second network device initiating, based on the authentication request, a first process to authenticate the user device or the over-the-top application;
receive an authentication result from the second network device, based on the authentication request, that the user device or the over-the-top application is authenticated;
send a message to a third network device for the third network device to implement the level of quality of service, the third network device initiating a second process, based on the message, to apply the level of quality of service to information sent between the over-the-top application and a provider associated with the over-the-top application;
receive a response from the third network device that the level of quality of service is being applied to the information sent between the over-the-top application and the provider; and
process the information sent between the over-the-top application and the provider based on the level of quality of service being applied to the information sent between the over-the-top application and the provider.

2. The system of claim 1, where the first network device is further to:
receive a second request to stop applying the level of quality of service to the over-the-top application;
send a third request, based on receiving the second request, to the third network device to stop applying the level of quality of service to the over-the-top application,
the third network device initiating a third process to stop applying the level of quality of service to the information sent between the over-the-top application and the provider;
receive a notification from the third network device that the level of quality of service is no longer being applied to the information being sent between the over-the-top application and the provider; and
send a message to the user device, based on receiving the notification, that the level of quality of service is no longer being applied to the information being sent between the over-the-top application and the provider.

3. The system of claim 1, where the first network device is further to:
receive a second request to change the level of quality of service being applied to the over-the-top application;
send a third request to the third network device, based on the second request, to change the level of quality of service being applied to the over-the-top application;
receive a second response from the third network device, based on the third request, that the level of quality is changed and a new level of quality of service is being applied to the information being sent between the over-the-top application and the provider; and
send a message to the user device that the level of quality of service is changed and the new level of quality of service is being applied to the information sent between the over-the-top application and the provider.

4. The system of claim 1, where the first network device is further to:
receive a second request to apply a particular level of quality of service to a second over-the-top application stored on the user device;
send a third request, based on receiving the second request, to the second network device,
the second network device initiating, based on the third request, a third process to authenticate the second over-the-top application;
receive a second response from the second network device, based on the third request, that the second over-the-top application is not authenticated; and
send a second message to the user device that the particular level of quality of service is not being applied to the second over-the-top application based on the second over-the-top application not being authenticated.

5. The system of claim 1, where the request to apply the level of quality of service to the over-the-top application includes a request to apply the level of quality of service to the over-the-top application for a finite interval of time.

6. The system of claim 1, where the first network device is further to:
receive a second request to apply a particular level of quality of service to a second over-the-top application at a same time that the level of quality of service is being applied to the over-the-top application;
send a third request, based on receiving the second request, to the second network device,
the second network device initiating, based on the third request, a third process to authenticate the second over-the-top application;
receive a second authentication result from the second network device, based on the third request, that the second over-the-top application is authenticated;
send a notification to the third network device based on receiving the second authentication result,
the third network device initiating, based on the notification, a fourth process to apply the particular level of quality of service to information sent between the second over-the-top application and a second provider associated with the second over-the-top application;
receive a second message, from the third network device, that the particular level of quality of service is being applied to information sent between the second over-the-top application and the second provider; and
send a third message to the user device that the particular level of quality of service is being applied to the second over-the-top application.

7. The system of claim 1, where, when processing the information sent between the over-the-top application and the provider, the first network device is to:
apply security operations to information sent from the provider to the over-the-top application or information sent from the over-the-top application to the provider.

8. The system of claim 1, where the first network device is further to:
receive a second request to apply a particular level of quality of service to a second over-the-top application at a same time that the level of quality of service is being applied to the over-the-top application;
send a third request, based on receiving the second request, to the second network device,
the second network device initiating a third process, based on the third request, to authenticate the second over-the-top application;
receive a second authentication result, from the second network device, that the second over-the-top application is not authenticated; and
send a second message to the user device that the particular level of quality of service is not being applied to the second over-the-top application based on the second authentication result.

9. The system of claim 1, where the first network device is further to:
receive, from the user device, a second request to apply a particular level of quality of service to a second over-the-top application at a same time that the level of quality of service is being applied to the over-the-top application;
deny the second request to apply the particular level of quality of service to the second over-the-top application; and notify the user device that the particular level of quality of service is not being applied to the second over-the-top application.

10. A method comprising:
receiving, by a first network device, a request to apply a level of quality of service to an over-the-top application stored on a user device;
sending, by the first network device, an authentication request to a second network device,
the second network device initiating, based on the authentication request, a process to authenticate the user device and the over-the-top application;
receiving, by the first network device, an authentication result, from the second network device, for the over-the-top application;
sending, by the first network device, a message to a provider of the over-the-top application for the provider to implement the level of quality of service,
the message including information regarding a quality of service result based on the authentication result received from the second network device; and
selectively processing information sent between the over-the-top application and the provider based on the quality of service result.

11. The method of claim 10, further comprising:
receiving a second request to apply a particular level of quality of service to a second over-the-top application stored on the user device;
denying the second request to apply the particular level of quality of service to the second over-the-top application without communicating with the second network device; and
notifying the user device that the particular level of quality of service is not being applied to the second over-the-top application.

12. The method of claim 10, further comprising:
sending, to a third network device and based on the authentication result, an instruction to apply the level of quality of service to the over-the-top application,
the third network device initiating, based on the instruction, a second process to apply the level of quality of service to information sent between the over-the-top application and the provider.

13. The method of claim 12, further comprising:
receiving a second request to apply a particular level of quality of service to a second over-the-top application, stored on the user device, at a same time the level of quality of service is applied to the over-the-top application;
accepting the second request to apply the particular level of quality of service to the second over-the-top application; and
notifying the user device that the particular level of quality of service is being applied to the second over-the-top application.

14. The method of claim 10, where selectively processing the information includes applying security operations to the information sent between the over-the-top application and the provider.

15. The method of claim 10, where selectively processing the information sent between the over-the-top application and the provider includes:
authenticating that the information, sent between the over-the-top application and the provider, is being sent from the user device.

16. The method of claim 10,
where the authentication result, from the second network device, includes a message to the first network device that the over-the-top application is not authenticated, and
where the method further comprises:
sending a message to the user device, based on the authentication result, that the level of quality of service is not applied to the information sent between the over-the-top application and the provider.

17. A method comprising:
receiving, by a first network device, an authentication request, from a second network device, to authenticate a user device and an over-the-top application, stored on the user device, to determine whether to apply a level of quality of service to the over-the-top application,
the first network device including a home subscriber server (HSS)/authentication, authorization, accounting (AAA) server;
authenticating, by the first network device, the user device, based on the authentication request;
authenticating, by the first network device, the over-the-top application, based on the authentication request; and
sending, by the first network device and to the second network device, an authentication result based on authenticating the user device and the over-the-top application,
the second network device initiating, based on the authentication result, a process to apply a level of quality of service to information sent between the over-the-top application and a provider associated with the over-the-top application.

18. The method of claim 17, where authenticating the over-the-top application includes authenticating that an amount of bandwidth requested by the over-the top application does not exceed a maximum bandwidth level allowed for the over-the-top application.

19. The method of claim 17, further comprising:
receiving, by the first network device, a second authentication request from the second network device to authenticate a second over-the-top application stored on the user device;
determining, by the first network device, that the second over-the-top application is requesting a level of bandwidth that exceeds a maximum level of bandwidth allowed for the second over-the-top application; and
sending, by the first network device, a message to the second network device that the second over-the-top application is not authenticated based on the requested level of bandwidth exceeding the maximum level of bandwidth.

20. The method of claim 17, where authenticating the over-the-top application includes:
determining whether the user device has received any level of quality of service for other over-the-top applications stored on the user device; and
determining, whether a combined bandwidth usage of bandwidth usage of the other over-the-top applications, based on the other over-the-top applications receiving any level of quality of service, and a requested bandwidth level, based on a requested level of quality of service for the over-the-top application, is less than a maximum level of bandwidth allowed for all over-the-top applications stored on the user device.

* * * * *